United States Patent

Sailer et al.

[11] 3,969,339
[45] July 13, 1976

[54] WATER-SOLUBLE PENTAKIS-AZO DYESTUFFS DERIVED FROM 4,4'-DIAMINOAZOBENZENE

[75] Inventors: Andre Louis Sailer; Pierre Frank, both of Du Rhone, France

[73] Assignee: Produits Chimiques Ugine Kuhlmann, Paris, France

[22] Filed: Sept. 14, 1973

[21] Appl. No.: 397,177

[30] Foreign Application Priority Data
Sept. 14, 1972  France .............................. 72.32530

[52] U.S. Cl. ...................................... 260/159; 8/13; 260/144; 428/473
[51] Int. Cl.$^2$ ...................... C09B 31/30; D06P 3/32
[58] Field of Search ........................... 260/144, 159

[56] References Cited
UNITED STATES PATENTS

| | | | |
|---|---|---|---|
| 1,976,044 | 10/1934 | Smith et al. ........................ | 260/144 |
| 2,117,426 | 5/1938 | Jordan et al. ..................... | 260/144 X |
| 2,153,201 | 4/1939 | Murphy et al. ................... | 260/144 X |
| 2,182,348 | 12/1939 | Murphy et al. ..................... | 260/144 |
| 2,270,675 | 1/1942 | Stein et al. ....................... | 260/144 X |

FOREIGN PATENTS OR APPLICATIONS

| 209,556 | 7/1940 | Switzerland ........................ | 260/144 |

*Primary Examiner*—Floyd D. Higel
*Attorney, Agent, or Firm*—Beveridge, DeGrandi, Kline, Lunsford

[57] ABSTRACT

The invention is directed to pentakisazo dyestuffs of the formula:

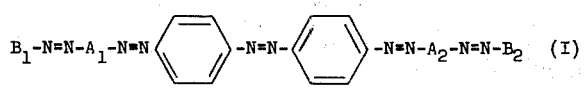

in which $A_1$ and $A_2$ may be the same or different and each is monosulphonaphthylene, hydroxy-monosulpho-naphthylene or hydroxy-disulphonaphthylene and $B_1$ and $B_2$ may be the same or different and each is dihydroxy-phenyl, diamino-phenyl, diamino-tolyl, diaminosulpho-phenyl, amino-hydroxy-phenyl, N-(sulphomethyl)-aminohydroxy-phenyl, amino-naphthyl, hydroxy-naphthyl, hydroxysulpho-naphthyl, amino-sulpho-naphthyl, amino-hydroxy-monosulpho-naphthyl, amino-hydroxy-disulpho-naphthyl, phenylmethyl-hydroxy-pyrazolyl, (dichloro-sulpho-phenyl)-methylhydroxy-pyrazolyl, (sulphophenyl)-methyl-hydroxy-pyrazolyl, 1-carbethoxy-2-oxo-propyl, N-phenyl-1-carbamoyl-2-oxy-propyl, N-(sulphophenyl)-1-carbamoyl-2-oxopropyl, 2,4-dioxo-3-pentyl, dicarbethoxy-methyl, phenyl-carboxy-hydroxy-pyrazolyl, N-tolyl-1-carbamoyl-2-oxo-propyl, or N-(chlorophenyl)-1-carbamoyl-2-oxopropyl; such dyestuffs are useful for dyeing animal or vegetable fibers in blue to black shades.

5 Claims, No Drawings

WATER-SOLUBLE PENTAKIS-AZO DYESTUFFS DERIVED FROM 4,4'-DIAMINOAZOBENZENE

Polyazo dyestuffs derived from benzidine (or 4,4'-diamino-biphenyl), utilisable for dyeing vegetable fibres, such as cotton, and animal fibres, such as silk and leather, in blue to black shades, are already known. However, it is also known that the benzidine used as the starting material for the preparation of these dyestuffs is a highly toxic product which causes cancer of the bladder.

On the other hand, some benzidine dyestuffs, for example the dyestuff known as No. 30235 in the Colour Index and most used for dyeing cotton and leather black, only have a limited solubility in water. For this reason, when they are applied to leather, they are deposited chiefly at the surface of the leather and are eliminated to a large extent during pumiceing or grinding.

We have found that new water-soluble pentakis-azo dyestuffs can be prepared from 4,4'-diamino-azobenzene, a product much less toxic than benzidine, and these dyestuffs are of very great interest for dyeing animal or vegetable fibres in blue to black shades.

According to the present invention pentakis-azo formula

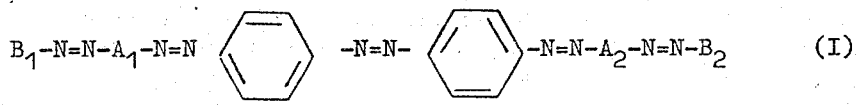
(I)

in which $A_1$ and $A_2$ which may be the same or different each represent the residue of a aminonaphthalene mono- or di-sulphonic acid possibly substituted by a hydroxy group, $B_1$ and $B_2$ which may be the same or different each represent the residue of a coupling compound of the benzene, naphthalene, heterocyclic, aliphatic or arylaliphatic series.

The dyestuffs of formula I have a better solubility in water than the dyestuffs derived from benzidine. They have an excellent affinity for leathers tanned in any way as well as for cotton and silk. The dyeings obtained are very level, fast to light, to various washing tests, to dry and wet rubbing and to solvents. In the special case of dyeings on leather, a better levelling and a better penetration are found than with the dyestuffs derived from benzidine. This is particularly important for leathers which have to be pumiced or ground after dyeing, since this mechanical operation involves a thinning of the shade which, in the case of a black, would give a greyish colouration at the surface of the pumiced or ground leather.

The dyestuffs of the general formula (I) may be prepared for example by coupling the tetrazo derivative of one mole of 4,4'-diamino-azobenzene with two moles, which may be the same or different, of aminoaphthalene-mono- or -di-sulphonic acid $H-A_1-NH_2$ and $H-A_2-NH_2$ each acid possibly being substituted by a hydroxy group, followed by tetrazotization of the trisazo compound of the formula:

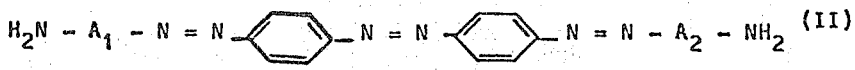
(II)

thus obtained and finally coupling of the tetrazo derivative with one mole of a coupling compound $B_1-H$ and one mole of a coupling compound $B_2-H$, the coupling compounds $B_1-H$ and $B_2-H$ being either different or, preferably, the same.

Examples of aminonaphthalene-mono- or di-sulphonic acids which may be used for the preparation of the dyestuffs of formula (I), are 1-amino-8-hydroxy-naphthalene-3,6-disulphonic acid, 1-amino-8-hydroxy-naphthalene-4,6-disulphonic acid, 2-amino-8-hydroxy-naphthalene-3,6-disulphonic acid, 2-amino-8-hydroxy-naphthalene-6-sulphonic acid, 3-amino-8-hydroxy-naphthalene-6-sulphonic acid, 1-amino-naphthalene-6-sulphonic acid and 1-amino-naphthalene-7-sulphonic acid.

Examples of coupling compounds $B_1-H$ and $B_2-H$ are aliphatic compounds such as acetylacetone, ethyl acetyl-acetate and ethyl malonate, benzene compounds such as 1,3-dihydroxy-benzene, 1,3-diamino-benzene, 1-amino-3-hydroxy-benzene and their derivatives substituted on the benzene nucleus by at least one methyl, sulphonic acid or carboxylic acid group, naphthalene compounds such as the naphthylamines, the naphthols, the aminohydroxynaphthalenes and their derivatives substituted on one or both benzene nuclei by at least one sulphonic acid group, heterocyclic compounds such as 1-phenyl-3-methyl or 3-carboxy-5-pyrazolones and their derivatives substituted on the phenyl group by at least one chlorine atom or sulphonic acid group, aryl-aliphatic compounds such as N-acetoacetyl-aniline and its derivatives substituted on the benzene nucleus by at least one methyl or sulphonic acid group or by at least one chlorine atom.

Dyestuffs having a great variety of black, blue to dark blue, and violet shades, as well as a large variety of properties, are obtained, depending on the nature of the residues $A_1$, $A_2$, $B_1$, and $B_2$.

When a total penetration of the dyestuff is required, for example, during the dyeing of skins or pelts for clothing and glove-making, dyestuffs of the following general formula are preferably used:

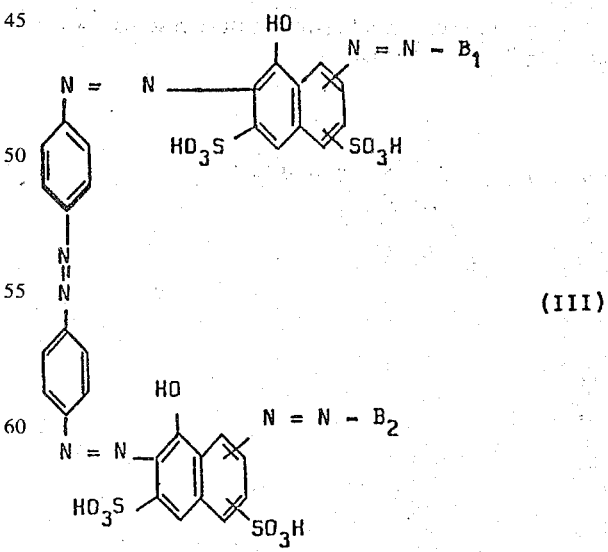
(III)

in which the residues $B_1$ and $B_2$ are preferably the same. These dyestuffs dye clear chrome leathers, chrome retanned leathers or leathers retanned by means of a vegetable or synthetic tannin and having a suede finish, or fine skins for clothing and glove making which are chrome tanned and retanned by means of a vegetable or synthetic tannin, through the whole thickness of the leather while giving it a shade which is superficially full, full-bodied and quite level. On all other types of leather, such as box, for example, they give full, full-bodied, very level and well penetrated shades.

On the other hand, if a full-bodied and cheap surface dyeing is required, dyestuffs of the following general formula are advantageously used.

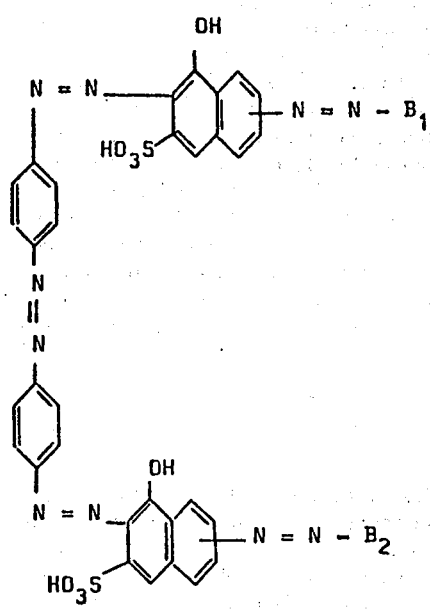

(IV)

in which the residues $B_1$ and $B_2$ are preferably the same. On leather these dyestuffs give shades which have penetrated well, but less than with the dyestuffs of formula (III).

The dyestuffs of formula (III) are the dyestuffs corresponding to the formulae:

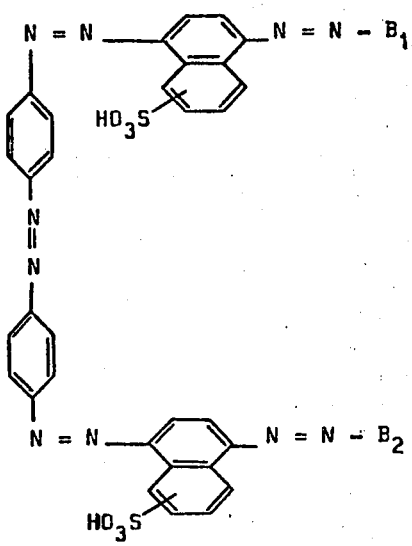

(V)

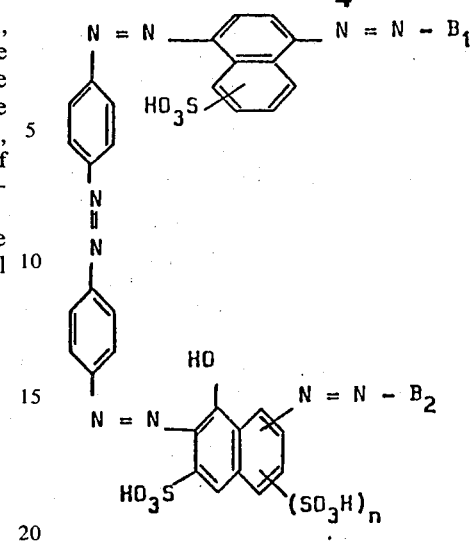

(VI)

in which n is 0 or 1 and the residues $B_1$ and $B_2$ are preferably the same, may be used for dyeing cotton. However, for dyeing cotton, the dyestuffs of formula (IV) are preferred to those of formula (III), since they lead to a more rapid exhaustion of the dyebath.

On account of their excellent fastness to acids, the dyestuffs of formula (I) enable constant shades to be obtained on skins tanned in different ways.

In the following Examples which are purely illustrative the parts are parts by weight unless the contrary is indicated.

EXAMPLE 1

21.2 parts of 4,4'-diamino-azobenzene are dissolved in 400 parts of water at 70°C. by means of 70 parts of a 20° Be solution of hydrochloric acid. The solution is cooled to 20°C. then ice is added until the temperature is 5°C. Then a solution of 14 parts of sodium nitrite in 28 parts of water is added and the compound is tetrazotised for an hour at 5°C.

During this time, a solution of 68.2 parts of the monosodium salt of 1-amino-8-hydroxy-naphthalene-3,6-disulphonic acid in 400 parts of water is prepared; the pH is taken to 7 by addition of a 36° Be solution of sodium hydroxide, 50 parts of sodium carbonate are added, and the mixture is cooled to 5°C. by the addition of ice.

The solution of the tetrazo derivative is run into the solution thus obtained over a period of an hour. The coupling is very rapid and when it is finished, the pH is taken to 4 by the addition of a 20° Be solution of hydrochloric acid. Then a further 70 parts of this same solution of hydrochloric acid are added and, while the temperature is maintained at 10°C., a solution of 14 parts of sodium nitrite in 28 parts of water is introduced. The trisazo dyestuff is diazotised for 3 hours, then a solution of 21.8 parts of 3-amino-phenol in 400 parts of water is added and the pH is taken to 8 by the addition of sodium carbonate over a period of 15 minutes. The coupling process is allowed to finish, then the pentakis-azo dyestuff is precipitated by the addition of hydrochloric acid and sodium chloride. The precipitated dyestuff is filtered off then dried. It may also be isolated by spraying the solution into an enclosure in which a current of hot air circulates.

4,4'-bis-[1-(2-amino-4-hydroxy-phenylazo)-3,6-disulpho-8-hydroxy-naphthyl(7)azo]-azobenzene is thus obtained which dyes leathers tanned in different ways and cotton is slightly greenish black shades which show excellent fastness to the usual tests (washing, solvents and light).

Table 1 below gives further Examples of pentakisazo dyestuffs according to the invention prepared according to the process of Example 1, but replacing the 3-amino-phenol by an equivalent quantity of the coupling compound B-H specified in the second column.

Table 1

| Ex. | Coupling compound B-H | Shade on leather |
|---|---|---|
| 2 | 1,3-dihydroxy-benzene | black |
| 3 | 1,3-diamino-benzene | slightly greenish black |
| 4 | 2,4-diamino-toluene | black |
| 5 | 2-hydroxy-naphthalene | deep reddish blue |
| 6 | 2-amino-8-hydroxy-naphthalene-6-sulphonic acid | reddish blue |
| 7 | N-sulphomethyl-m-aminophenol | greenish blue |
| 8 | ethyl acetylacetate | deep blue |
| 9 | N-acetylacetyl-aniline | deep greenish blue |
| 10 | 3-sulpho-N-acetylacetyl-aniline | deep greenish blue |
| 11 | 1-hydroxy-naphthalene-4-sulphonic acid | deep reddish blue |
| 12 | 1,2-dihydroxy-benzene | violet |
| 13 | 1-phenyl-3-methyl-5-pyrazolone | greenish black |
| 14 | 2',5'-dichloro-4'-sulpho-1-phenyl-3-methyl-5-pyrazolone | deep greenish blue |
| 15 | 1-amino-naphthalene-6-sulphonic acid | reddish blue |
| 16 | 1-amino-8-hydroxy-naphthalene-4-sulphonic acid | deep reddish blue |
| 17 | 2-hydroxy-naphthalene-6-sulphonic acid | deep reddish blue |
| 18 | 2-hydroxy-naphthalene-8-sulphonic acid | deep reddish blue |
| 19 | acetylacetone | deep blue |
| 20 | ethyl malonate | deep blue |

EXAMPLE 21

If in Example 1, the 1-amino-8-hydroxy-naphthalene-3,6-disulphonic acid is replaced by 47.8 parts of 2-amino-8-hydroxy-naphthalene-6-sulphonic acid then 4,4'-bis-[2-(2-amino-4-hydroxy-phenylazo)-8-hydroxy-6-sulpho-napthalyl(7)-azo]-azobenzene is obtained which dyes leathers tanned in different ways and cotton in shades which are black with a tendency to green.

Table 2 below gives other Examples of pentakisazo dyestuffs according to the invention prepared on operating as in Example 1, but replacing, on the one hand 1-amino-8-hydroxy-napthalene-3,6-disulphonic acid by 47.8 parts of 2-amino-8-hydroxy-naphthalene-6-sulphonic acid and, on the other hand, 3-amino-phenol by an equivalent amount of the coupling compound B-H indicated in the second column.

Table 2

| Example | Coupling compound B-H | Shade on leather |
|---|---|---|
| 22 | 1,3-diamino-benzene | reddish black |
| 23 | 1,3-dihydroxy-benzene | black |
| 24 | 2,4-diamino-toluene | reddish black |
| 25 | 2-amino-8-hydroxy-naphthalene-6-sulphonic acid | black |
| 26 | 2,4-diamino-benzene-sulphonic acid | black |
| 27 | N-sulphomethyl-m-aminophenol | black |
| 28 | 4'-sulpho-1-phenyl-3-methyl-5-pyrazolone | reddish black |

EXAMPLE 29

If in Example 21, the 2-amino-8-hydroxy-naphthalene-6-sulphonic acid is replaced by the same quantity of 3-amino-8-hydroxy-naphthalene-6-sulphonic acid, a dyestuff of similar shade and properties is obtained.

EXAMPLE 30

If in Example 1, the monosodium salt of 1-amino-8-hydroxy-naphthalene-3,6-disulphonic acid is replaced by the same quantity of the monosodium salt of 2-amino-8-hydroxy-naphthalene-3,6-disulphonic acid, a dyestuff is obtained which dyes leathers tanned in different ways and cotton in black shades which are very fast to the usual tests, (washing, solvents and light).

Table 3 below gives other Examples of pentakisazo dyestuffs according to the invention prepared as in Example 1, but replacing on the one hand, the monosodium salt of 1-amino-8-hydroxy-naphthalene-3,6-disulphonic acid by the same quantity of the monosodium salt of 2-amino-8-hydroxy-naphthalene-3,6-disulphonic acid and, on the other hand, the 3-amino-phenol by an equivalent quantity of the coupling compound B-H indicated in the second column.

Table 3

| Example | Coupling compound B-H | Shade on leather |
|---|---|---|
| 31 | 1,3-dihydroxy-benzene | violet black |
| 32 | 1,3-diamino-benzene | bluish black |
| 33 | 2-amino-8-hydroxy-naphthalene-6-sulphonic acid | reddish blue |
| 34 | N-sulphomethyl-m-aminophenol | black |

EXAMPLE 35

If in Example 1 the 1-amino-8-hydroxy-naphthalene-3,6-disulphonic acid is replaced by the same quantity of 1-amino-8-hydroxy-naphthalene-4,6-disulphonic acid, a dyestuff is obtained of similar shade and properties.

EXAMPLE 36

21.2 parts of 4,4'-diamino-azobenzene are tetrazotised as indicated in Example 1, then a solution at about pH 7 of 44.6 parts of 1-amino-naphthalene-6-sulphonic acid in 400 parts of water is introduced in a period of an hour into the solution of the azotetrazo derivative. Then a 20% solution of sodium carbonate is added over an hour in order to attain pH 7 and the coupling is allowed to finish in about 30 minutes. The suspension of the trisazo dyestuff obtained is then taken to pH 4 by the addition of a 20° Be solution of hydrochloric acid, then a further 70 parts of this same solution of hydrochloric acid are added. While maintaining the temperature at 5°C. a solution of 14 parts of sodium nitrite in 28 parts of water is added and the dyestuff is diazotised for 3 hours at 5°C. Then a solution at pH 7 of 44.8 parts of 1-hydroxy-naphthalene-4-sulphonic acid in 400 parts of water containing a little sodium hydroxide is added. Finally sodium carbonate to give a pH of 8 is added over a period of 15 minutes. When the coupling process is complete, the dyestuff is isolated by the usual processes. The 4,4'-bis-{4[1-hydroxy-4-sulpho-naphthyl(2)azo]-7-sulpho-naphthyl(1) azo}-azobenzene thus obtained dyes leathers tanned in different ways in reddish blue shades fast to the usual tests (washing, solvents and light).

Table 4 below gives other Examples of pentakisazo dyestuffs prepared as in Example 36, but by replacing the 1-hydroxy-naphthalene-4-sulphonic acid by the equivalent amount of the coupling compound B-H indicated in the second column.

Table 4

| Example | Coupling compound B-H | Shade on leather |
| --- | --- | --- |
| 37 | 3-sulpho-N-acetoacetyl-aniline | violet |
| 38 | 4'-sulpho-1-phenyl-3-methyl-5-pyrazolone | violet |
| 39 | 1-amino-8-hydroxy-naphthalene-3,6-disulphonic acid | black |

EXAMPLE 40

21.2 parts of 4,4'-diamino-azobenzene are tetrazotised as indicated in Example 1, then a solution at pH 7 of 22.3 parts of 1-amino-naphthalene-6-sulphonic acid in 200 parts of water containing a little sodium hydroxide is added over a period of an hour. Then the mixture is taken to pH 7 by the addition of a 20% solution of sodium carbonate over a period of an hour. When the mono-coupling process is finished, a solution at pH 7 of 34.1 parts of the monosodium salt of 1-amino-8-hydroxy-naphthalene-3,6-disulphonic acid in 200 parts of water containing a little sodium hydroxide is introduced and then 10 parts of sodium carbonate are added.

When the coupling is finished, the pH is taken to 4 by the addition of a 20° Be solution of hydrochloric acid, then a further 70 parts of this same hydrochloric acid solution are added. Then a solution of 14 parts of sodium nitrite in 28 parts of water are added and the product is diazotised for 3 hours in 5°C. and a solution of 21.8 parts of 3-aminophenol in 400 parts of water is added, then sodium carbonate until pH 8 is obtained. When the coupling is complete, the 4-[4-(2-amino-4-hydroxy-phenylazo)-7-sulpho-(naphthyl(1)-azo]-4'[-8-(2-amino-4-hydroxy-phenylazo)-3,6-disulpho-1-hydroxynaphthyl(2)-azo]-azobenzene thus obtained is isolated by the usual methods. It dyes leathers tanned in different ways and cotton in deep blue shades which are particularly fast to the usual tests (washing, solvents and light).

EXAMPLE 41

6 parts of the dyestuff obtained in Example 2 are dissolved in 1000 parts of water. The solution is taken to a temperature of 40°C. and then 100 parts of a cotton fabric are introduced. The temperature is raised to 90°C. over a period of 30 minutes, then 25 parts of sodium sulphate are added. Dyeing is effected for 30 minutes at 90°C. and then a further 25 parts of sodium sulphate are added. Dyeing is carried out for a further 30 minutes at 90°C. and then the fabric is rinsed in cold water and dried. A full-bodied black shade is obtained which has good general properties.

EXAMPLE 42

100 parts of a clear chrome box-calf are rinsed, neutralised, then rinsed again, then introduced into a fulling machine containing a solution of one part of the dyestuff of Example 1 in 500 parts of water. It is fulled for 45 minutes at 60°C. and then a tawing paste in suspension in 50 parts of water is introduced by means of a dispersing agent. Fulling is continued for a further 30 minutes and the box calf is rinsed and dried. The box calf is dyed uniformly in a slightly greenish black shade, which is particularly fast to the usual tests (washing, solvents and light).

EXAMPLE 43

100 parts of chrome-tanned sheepskin for clothing, retanned by means of a synthetic or vegetable tannin, are rewetted in the presence of a little ammonia. They are introduced into a fulling machine containing a solution of 6 parts of the dyestuff of Example 5 in 2000 parts of water at 60°C. Fulling is effected for an hour at 60°C. and then 3 parts of formic acid are introduced. Fulling is carried out for a further 30 minutes and the skin is rinsed and dried. A skin is obtained dyed uniformly over its whole thickness, in a deep reddish blue shade which is specially fast to the usual tests (washing, solvents and light).

We claim:

1. Pentakisazo dyestuff of the formula:

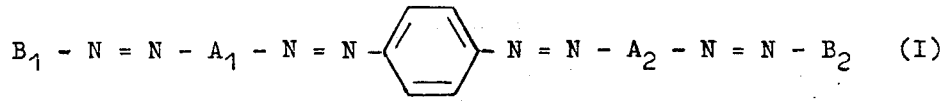

in which $A_1$ and $A_2$ are the same or different and each is monosulpho-naphthylene, hydroxy-monosulpho-naphthylene or hydroxy-disulpho-naphthylene and $B_1$ and $B_2$ are the same or different and each is dihydroxy-phenyl, diamino-phenyl, diamino-tolyl, diamino-sulpho-phenyl, amino-hydroxy-phenyl, N-(sulphomethyl)-amino-hydroxy-phenyl, amino-naphthyl, hydroxy-naphthyl, hydroxy-sulpho-naphthyl, amino-sulpho-naphthyl, amino-hydroxy-monosulpho-naphthyl, amino-hydroxy-disulpho-naphthyl, phenyl-methyl-hydroxy-pyrazolyl, (dichloro-sulpho-phenyl)-methyl-hydroxy-pyrazolyl, (sulphophenyl)-methyl-hydroxy-pyrazolyl, 1-carbethoxy-2-oxo-propyl, N-phenyl-1-carbamoyl-2-oxy-propyl, N-(sulphophenyl)-1-carbamoyl-2-oxo-propyl, 2,4-dioxo-3-pentyl, dicarbethoxy-methyl, phenyl-carboxy-hydroxy-pyrazolyl, N-tolyl-1-carbamoyl-2-oxo-propyl, or N-(chlorophenyl)-1-carbamoyl-2-oxo-propyl.

2. Pentakisazo dyestuffs according to claim 1 corresponding to the general formula:

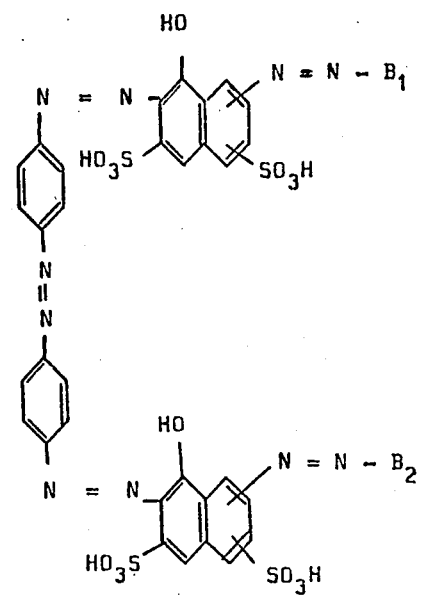

in which $B_1$ and $B_2$ are the same.

3. Pentakisazo dyestuff according to claim 1 corresponding to the formula:

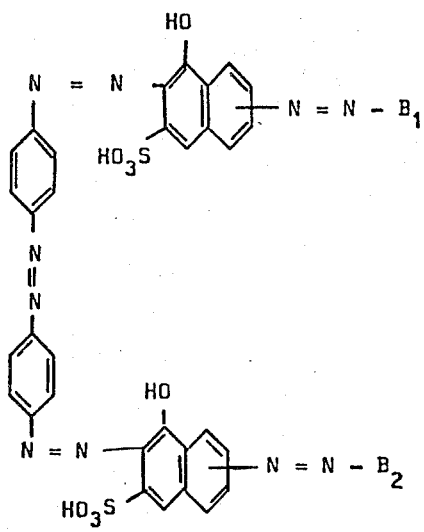

in which $B_1$ and $B_2$ are the same.

4. Pentakisazo dyestuff according to claim 1 corresponding to the formula:

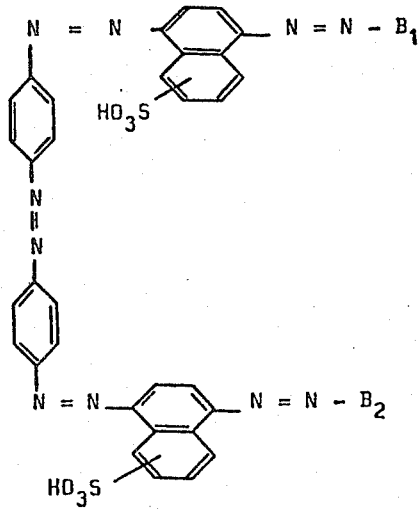

in which $B_1$ and $B_2$ are the same.

5. Pentakisazo dyestuff according to claim 1 corresponding to the formula:

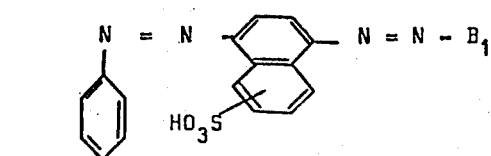
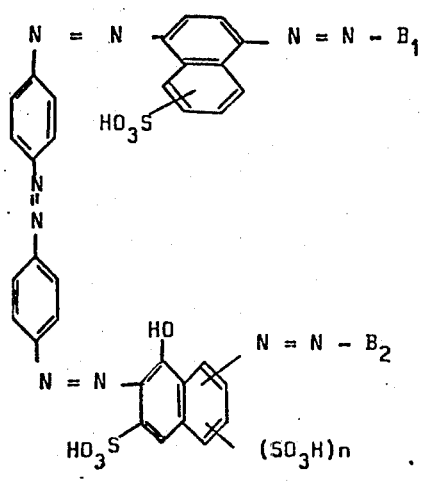

in which $n$ represents the number 0 or 1 and $B_1$ and $B_2$ are the same.

* * * * *

UNITED STATES PATENT OFFICE
CERTIFICATION OF CORRECTION

Patent No. 2,969,339

January 24, 1961

Manfred Dohr et al.

It is hereby certified that error appears in the above numbered patent requiring correction and that the said Letters Patent should read as corrected below.

Column 4, line 53, for the claim reference numeral "6" read -- 4 --.

Signed and sealed this 18th day of July 1961.

(SEAL)
Attest:

ERNEST W. SWIDER
Attesting Officer

DAVID L. LADD
Commissioner of Patents